UNITED STATES PATENT OFFICE.

FREDERICK W. BROWN, OF FLORENCE, COLORADO, ASSIGNOR OF ONE-HALF TO LOUIS M. SCHMIDT, OF HARTFORD, CONNECTICUT.

METHOD OF MANUFACTURE OF HYDRAULIC CEMENT.

1,033,984.        Specification of Letters Patent.     Patented July 30, 1912.

No Drawing.      Application filed September 14, 1910. Serial No. 581,952.

*To all whom it may concern:*

Be it known that I, FREDERICK W. BROWN, a citizen of the United States, residing at Florence, in the county of Fremont and State of Colorado, have invented certain new and useful Improvements in Methods of Manufacture of Hydraulic Cement, of which the following is a specification.

My invention relates to improvements in method of manufacture of hydraulic cement, and the objects of my improvements are the production of a superior product and by means that are reliable and economical, and has particular reference to the manufacture of hydraulic gypsum and the product resulting from a combination of the same with furnace slags, pozzuolana, trass, and similar silicious substances and serviceable as a hydraulic cement.

In my improved process, raw gypsum in any of the forms occurring in nature, or in any form derived from natural gypsum or lime sulfates, is first reduced by crushing or milling to any suitably sized fragments for handling and treatment, and is then introduced into an oxidizing furnace capable of maintaining a temperature of 2000° F. and upward, and which may be a rotary kiln and which may be a slightly inclined or level cylinder, rotated on a horizontal axis and is fired at one end and fed with raw material at the other, such as is used in the manufacture of Portland cement, or some other device.

I find it advantageous to have the material travel through the kiln contrawise to the fire. The material is heated or burned to a clinker or liquid, as the degree of heat required to produce a sufficient degree of decomposition may make necessary. In the form of clinker the burned product is withdrawn, cooled and ground to any desired fineness. If the liquid product is desired, it is clinkered by cooling with air or water as may be chosen for convenience, but preferably by sprinkling or submergence in water. The resultant material is dried and ground to the desired fineness. This burned and ground gypsum is a hydraulic gypsum. The virtue of the process is this. It is more convenient and economical to handle by this method and it is practical to attain any desired temperature. The higher the temperature and the more decomposed the burnt gypsum becomes in consequence, the greater the hydraulic power, and the smaller the amount required in the treatment of slag or equivalent material to produce from it a high grade of hydraulic cement. I am aware that hydraulic gypsum is produced in stationary furnaces and at temperatures from 1500° to 2000° F., and that at the latter temperature some slight amount of decomposition of the gypsum occurs, but my process simplifies and improves upon the processes heretofore used, in the manner and for the reasons stated. Accordingly, by my process, burnt gypsum can be produced to a higher degree of perfection and under more complete control than by any process heretofore known. The burnt gypsum above provided is then mixed with ground furnace slag. The gypsum and slag may be ground separately, but preferably are ground together. The greater the degree of fineness, the more effective the cementing power. They may be mixed in any desired proportion, but preferably I specify a minimum of 5% of burnt gypsum to 95% of slag, and a maximum of 50% of burnt gypsum to 50% of slag. The slag used should be as high in content of lime as available, since the more lime in the slag the less burnt gypsum is required. For grinding purposes it is desirable to use granulated slag, subsequently dried.

No other ingredients and no other treatment than specified are essential to the production of such hydraulic cement. As stated, however, the slag may be replaced by other equivalent materials of silicious cement such as pozzuolana, and trass. Also it is evident that similar hydraulic or burnt gypsum produced by other means than those described, can be used to produce the hydraulic cement described by combining the same with the ingredients mentioned.

I claim as my invention:—

1. The process of producing hydraulic cement consisting of subjecting calcium sulfate in any of its forms, hydrated or anhydrous, to an oxidizing temperature of not less than 2000 degrees Fahrenheit, till a portion of the calcium sulfate is decomposed, and in combining this product with silicious material.

2. The process of producing hydraulic cement consisting of subjecting calcium sulfate in any of its forms, hydrated or anhydrous, to an oxidizing temperature of not less than 2000 degrees Fahrenheit, till a portion of the calcium sulfate is decomposed, cooling this product, and in combining the same with silicious material.

FREDERICK W. BROWN.

Witnesses:
HENRY K. GORDON,
M. F. RICH.